United States Patent
Kumar

(10) Patent No.: US 9,736,754 B2
(45) Date of Patent: Aug. 15, 2017

(54) DATA DISTRIBUTION TO PORTABLE ELECTRONIC DEVICES

(71) Applicant: Dinesh Kumar, Bangalore (IN)

(72) Inventor: Dinesh Kumar, Bangalore (IN)

(73) Assignee: SAP SE, Walldorf (DE)

( * ) Notice: Subject to any disclaimer, the term of this patent is extended or adjusted under 35 U.S.C. 154(b) by 163 days.

(21) Appl. No.: 14/527,790

(22) Filed: Oct. 30, 2014

(65) Prior Publication Data
US 2016/0127976 A1    May 5, 2016

(51) Int. Cl.
| | | |
|---|---|---|
| H04L 12/28 | (2006.01) | |
| H04W 4/00 | (2009.01) | |
| H04W 40/04 | (2009.01) | |
| H04W 4/02 | (2009.01) | |
| H04W 84/18 | (2009.01) | |
| H04W 76/02 | (2009.01) | |

(52) U.S. Cl.
CPC ............. *H04W 40/04* (2013.01); *H04W 4/02* (2013.01); *H04W 76/023* (2013.01); *H04W 84/18* (2013.01)

(58) Field of Classification Search
CPC ..... H04L 67/1002; H04L 67/10; H04L 67/32; H04L 67/322; H04L 67/325; H04L 67/327; H04L 12/24; H04L 63/0272; G06F 9/505; G06F 9/5055; G06F 9/5061; G06F 9/5083; H04N 7/1738
See application file for complete search history.

(56) References Cited

U.S. PATENT DOCUMENTS

| | | | |
|---|---|---|---|
| 6,731,940 B1 | 5/2004 | Nagendran | |
| 7,761,900 B2 * | 7/2010 | Crayford | H04N 7/17318 709/223 |
| 8,886,822 B2 * | 11/2014 | Pedersen | H04L 63/0272 709/219 |
| 2012/0198075 A1 | 8/2012 | Crowe et al. | |

OTHER PUBLICATIONS

Anna-Kaisa Pietiläinen et al; "MobiClique: Middleware for Mobile Social Networking"; Proceeding of WOSN'09, Aug. 17, 2009, Barcelona, Spain; 6 pages; (http://dl.acm.org/citation.cfm?id=1592678).

Raul Jimenez et al; "Tribler Mobile: P2P Video Streaming from and to Mobile Devices"; published online Nov. 25, 2013, last updated: Dec. 3, 2013; 8 pages; (http://kth.diva-portal.org/smash/record.jsf?pid=diva2%3A667079&dswid=9436).

\* cited by examiner

*Primary Examiner* — Hanh N Nguyen

(57) ABSTRACT

Various embodiments of systems and methods for data distribution to portable electronic devices are described herein. Initially a data server receives a data download request from one or more portable electronic devices. Next the requested data is divided into a plurality of data portions. Next based on an an-hoc network, a data-transfer route between the one or more portable electronic devices and a plurality of portable electronic devices connected to the data server are identified. The data server then forwards the plurality of data portions to the plurality of portable electronic devices connected to the data server. Finally, based on the identified data-transfer route, the requested data from the one or more portable electronic devices to the other portable electronic devices is transferred.

19 Claims, 10 Drawing Sheets

(12) United States Patent
US 9,736,754 B2

DATA DISTRIBUTION TO PORTABLE ELECTRONIC DEVICES

BACKGROUND

Portable electronic devices, for example, cellular or satellite telephones, laptop computers, personal digital assistants, electronic book readers, and the like, are fast becoming prevalent in everyday life. With the advent of data download facility on portable electronic devices these devices have also become a source of entertainment along with being a communication means. Typically the portable electronic devices download data, such as mobile apps, videos, games, etc., from data servers.

The increase in the number of portable electronic devices and the desirability of these services over the years has increased the load on the data servers, which is undesirable. Further the data servers can only transfer data to devices that are connected to the data server. Therefore, in the existing system a device not connected to a data server cannot download data from the data server, which is also undesirable.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Embodiments of techniques for distributing data to the portable electronic devices are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment. Thus, the appearances of these phrases in various places throughout this specification are not necessarily all referring to the same embodiment. Furthermore, the particular features, structures, or characteristics may be combined in any suitable manner in one or more embodiments.

Figure 1:
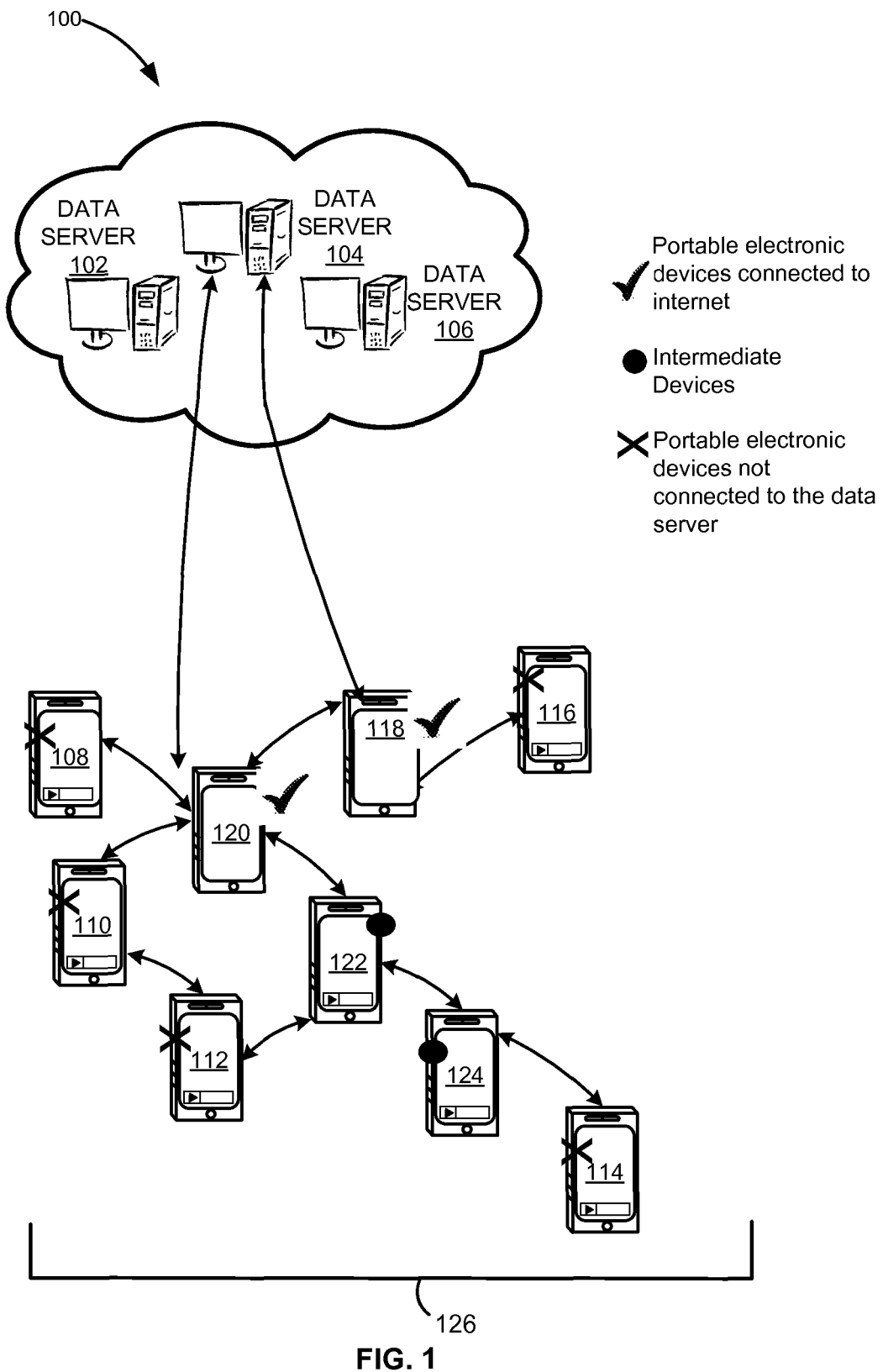
FIG. 1 is an exemplary block diagram illustrating a system for distributing data to several portable electronic devices, according to an embodiment.

FIG. 1 is an exemplary block diagram illustrating system 100 for distributing data to several portable electronic devices, according to an embodiment. The data may be distributed from a data store, for example, a data server, a database, a file system, a directory, etc. The data store, for example data servers 102-106, may distribute the data to several portable electronic devices, for example, devices 108, 110, 112, 114, and 116. In one embodiment, the data servers 102, 104, and 106 are mobile content management servers included in a Mobile Device Management (MDM) server, for example, SAP Afaria® MDM server. A mobile content management server manages and delivers data to one or more portable electronic devices enrolled with the mobile content management server. The data may include, for example, applications, web clips, messages, updates, etc. The portable electronic devices may be cellular or satellite telephones, laptop computers, personal digital assistants, electronic book readers, wearable devices such as smart watches, intelligent eyewear, etc.

In one embodiment, the data distribution to the different portable electronic devices 108, 110, 112, 114, and 116 is based on location of these devices. For a location-based data distribution, initially the different portable electronic devices 108, 110, 112, 114, 116, 118, 120, 122, and 124 establish an ad-hoc network 126. An ad-hoc network 126 refers to a network that does not require an infrastructure for establishing a communication session. The ad-hoc network 126 may include, for example, devices 118 and 120 that are connected to the data servers 102-106, devices 108, 110, 112, 114 and 116 that are not connected to the data servers 102-106, and intermediate devices 122 and 124. The intermediate devices 122 and 124 act as a device hop or data-forwarding device that forwards data from the connected portable device 120 to the disconnected portable device 114. The data-forwarding device may also forward data from a disconnected or connected portable electronic device to another disconnected or connected portable electronic device. The ad-hoc network 126 may be, for example, a Wi-Fi Direct® network. Wi-Fi Direct® is a Wi-Fi® standard that enables devices to connect with each other without requiring a wireless access point. The different portable electronic devices 108-124 in the established ad-hoc network 126 are identified as portable electronic devices included in a particular location. A location may refer to a pre-defined region, for example, an office location, a city, etc. The information of the different portable electronic devices 108-124, in a particular location, is stored in the data servers 102-106. In one embodiment, a location-specific graph is generated based on the portable electronic devices in a particular region. The graph includes the different portable electronic devices as nodes and the ad-hoc network connection between the portable electronic devices as edges connecting the nodes.

In one embodiment, the data servers 102-106 receive data requests from the portable electronic devices 108-116. The data requests may be for receiving data stored at the data servers 102-106. The data servers 102-106 then determine a location-specific graph that includes the portable electronic devices 108-116 requesting data. In this example, assume that the portable electronic devices request a video clip of 100 MB. The data servers 102-106 determine that portable electronic devices 108-116 are included in the location-specific graph that includes devices 108-124. Next, a data-transfer route between the data requesting devices 108-116 and portable electronic devices 118 and 120 connected to the data servers 102-106 are identified using the location-specific graph. In this example, the data-transfer routes for portable electronic devices 108 and 110 include the device name of device 120 that is connected to the data servers 102-106. The data-route for the device 114 is device 120→device 122→device 124→device 114 that defines the route for transferring data from the connected portable electronic device 120 to the data requesting device 114. Similarly the data transfer route for portable electronic device 116 is device name of device 118 that is connected to the data servers 102-106. In one embodiment, the data server forwards the determined data-transfer route to the connected portable electronic devices 118 and 120. The connected portable electronic devices 118 and 120 then transfer the data to portable electronic devices 108-116, requesting data, using the identified data-transfer route.

Utilizing the location of the portable electronic devices 108-116 to transfer data reduces the load on the data servers 102-106. For example, the data servers 102-106 transfer the data only to devices 118 and 120 connected to the data servers 102-106, that then forward it to the portable electronic devices 108-116 that requested it. This may reduce the data load on the servers 102-106 by up to ⅗ times. To further reduce the load on the data servers 102-106, the data servers 102-106 divide the data into several portions and then distribute the different portions of data to the portable electronic devices 118 and 120 connected to the data servers 102-106. The portable electronic devices 118 and 120, which store the different portions of the data, then deliver the data to the data requesting devices 108-116. For example, the data server may divide the 100 MB data into two portions of 50 MB and then distribute one portion of the data to the portable electronic device 118 and other portion of the data to the portable electronic device 120. The devices 118 and 120 then distribute the data to the data requesting devices 108-116. This may additionally reduce the data-load on the data severs 102-106 by ½.

Figure 2:
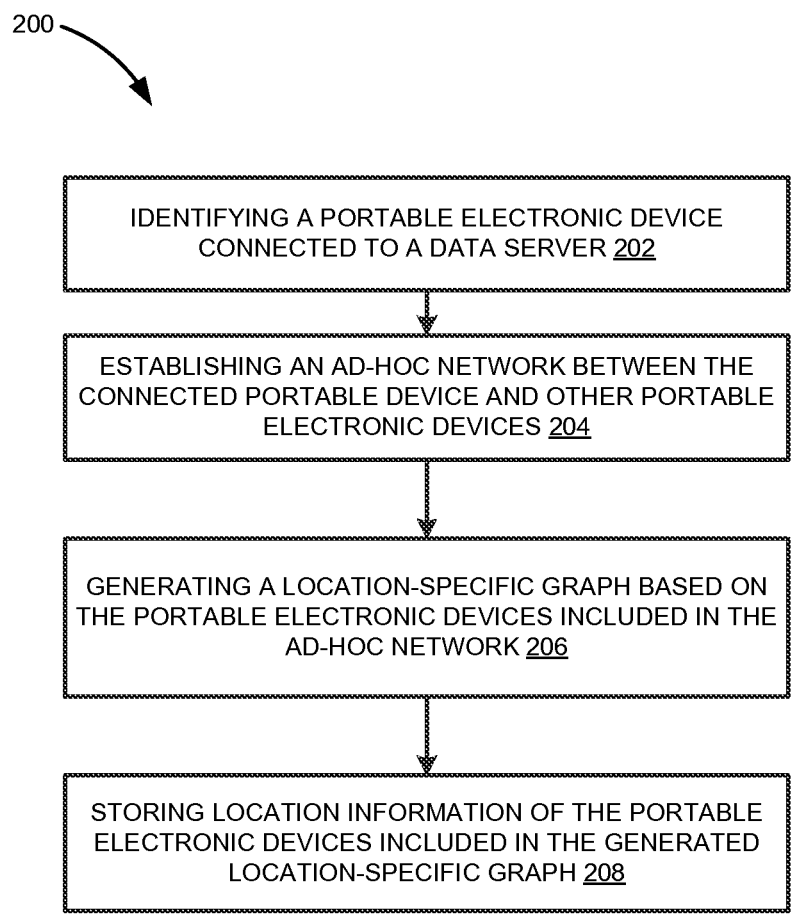
FIG. 2 is a flow diagram illustrating a process for storing information related to portable electronic devices at a data server, according to an embodiment.

FIG. 2 is a flow diagram illustrating process 200 for storing information related to portable electronic devices at a data server, according to an embodiment. Initially, at 202, a portable electronic device connected to the data server is identified. In one embodiment, the portable electronic device is identified when the portable electronic device connects to the data server. Next, an ad-hoc network is established between the connected portable electronic device and other portable electronic devices (204). In one embodiment, the ad-hoc network is established without using the Internet. The ad-hoc network and the connection between the data server and some of the portable electronic devices may together form a heterogeneous network for data communication between the data server and the portable electronic devices. A heterogeneous network is a network that includes several different connection means for communicating between two devices. For example, the data server may communicate with the portable electronic device, connected to the data server, using the Internet and the connected portable electronic device can then communicate with another portable electronic device, not connected to the data server, via an ad-hoc network, for example a Wi-Fi® network.

The heterogeneous network may also be established between the different portable electronic devices. For example, two of the portable electronic devices may be connected by a network connector, for example, RJ45 or 8P8C connector and the other portable electronic devices may be connected using a Wi-Fi® or Bluetooth. The different portable electronic devices in the ad-hoc network are identified as portable electronic devices included in a particular region. In one embodiment, the location of the portable electronic device, identified at block 202, is determined The different portable electronic devices in the ad-hoc network are then identified as portable electronic devices included in the determined location. For example, consider that the location of a portable electronic device connected to the data-server is identified as New York City. The portable electronic device establishes an ad-hoc network with 9 other portable electronic devices. In this case, the 10 devices included in the ad-hoc network are identified as included in the location New York City.

A location-specific graph is then generated based on the portable electronic devices included in the ad-hoc network (206). The location-specific graph represents the different portable electronic devices included in a particular region. For example, a location-specific graph for New York City represents the portable electronic devices and the connection between the portable electronic devices included in New York City. The location-specific graph may be an undirected graph that has vertices corresponding to the portable electronic devices, included in the ad-hoc network. The edges in the graph represent data-transfer routes between the portable electronic devices.

In one embodiment, the graph is divided into several sub-graphs that correspond to sub-location of a particular location. For example, the New York city-specific device graph may be divided to obtain five sub-graphs corresponding to the five different areas, Manhattan, Brooklyn, Queens, The Bronx, and Staten Island, of New York City. The five sub-graphs represent portable electronic devices included in the different areas. Finally, the location information of the portable electronic devices included in the location-specific graph is stored (208). In one embodiment, the location information of the portable electronic devices included in the location-specific device graph is retrieved and stored. In one embodiment some of the vertices included in the sub-graph are stored in a hash-table. For example, consider that the Manhattan-specific graph includes four devices: "device 1", "device 2", "device 3", and "device 4". The locations of these four devices 1-4 are 41°24', 21°32', 44°65', and 15°36', respectively. This location information is retrieved and stored. The location information related to some of the vertices is stored in a hash table. The vertices stored in the hash table may assist in identifying the location of a new device, by identifying the sub-graph corresponding to a particular new device. In one embodiment, the hash table is stored at the data server.

The data server may store other metadata information of the portable electronic device along with the location information. For example, the data server may store a list of in-the-network devices, included in the location-specific graph, corresponding to the portable electronic device. In-the-network devices, corresponding to a portable electronic device, include the devices in the ad-hoc network that are directly connected to a particular portable electronic device or indirectly connected to the portable electronic device via intermediate devices. In one embodiment, the intermediate devices are also included in the list of in-the-network devices. For example, consider that the ad-hoc network includes five devices: device 1, device 2, device 3, device 4, and device 5. Assume that device 1 is directly connected to device 2 and indirectly connected to device 5 via devices 3 and 4. In this case, the in-the-network devices corresponding to device 1 are device 2, device 3, device 4, and device 5. The in-the-network device list corresponding to device 1, which includes device 2, device 3, device 4, and device 5, is stored corresponding to device 1 at the data server. The data server may also store location information of the portable electronic devices. In one embodiment, the data server may also store metadata related to the data stored in a particular portable electronic device. In one embodiment, a disconnected portable electronic device stores a data transfer path that connects the disconnected portable electronic device to the data server. The data transfer path includes intermediate devices that transfer data between the disconnected device and the data server.

In one embodiment, the location of a portable electronic device is determined periodically and the latest location information, the neighboring device, etc. of the portable electronic devices is updated at the data server. In case a portable electronic device is connected to the data server then the location information is updated immediately when the location of the device changes. For a disconnected device, the location information of the disconnected device is periodically sent to the data server by the disconnected device via a connected portable electronic device. When the location of a disconnected portable electronic device changes then it may get disconnected from the portable electronic device that was sending its metadata information to the data server. In another embodiment, a connected portable electronic device may get disconnected with the data server and therefore may not be able to send data to the data server. In both the scenarios discussed above, the disconnected portable electronic device sends a path identification request to the in-the-network portable electronic devices corresponding to the disconnected portable electronic device. A check is then performed to identify whether a neighboring device corresponding to the disconnected portable electronic device is connected to the data server or includes a data transfer route that connects the neighboring portable electronic device to the data server. Neighboring devices, of a device, are connected or disconnected devices that are directly connected to the device without intermediate devices between two devices. In case the neighboring device is connected to the data server then the data-transfer route is updated to include the neighboring connected portable electronic device. In case the in-the-network device is not connected to the data server but is connected to a portable electronic device, connected to the data server via a data-transfer route, the data-transfer route is stored corresponding to the disconnected device. In the example described in the previous paragraph, consider that device 5 changes its location such that the device 5 is not connected to device 1. The device 5 sends a path identification request packet that is received by devices 8, 9, and 10. Devices 8, 9, and 10 are not shown in the figures. In case device 8 is connected to the data server then the data-transfer route for device 1 includes device 8. Further, in another scenario assume that devices 8-10 are not connected to the data server but device 9 is connected to device 1, which is connected to the data server, by a data transfer route (device 9→device 8→device 2→device 1) then this data transfer route is stored as data transfer route for device 5. In one embodiment, the data server sends a metadata transfer acknowledgement to the portable electronic device after receiving the metadata. In one embodiment, data server may not be able to send the metadata transfer acknowledgment to the disconnected portable electronic device due to several reasons, for example, change of location of the portable electronic device, unavailability of connected portable electronic devices etc. In this case, a determination is made whether disconnected portable electronic device is neighboring to any connected portable electronic device. The data server then transfers the metadata acknowledgment via the identified connected portable electronic device that is neighboring to the disconnected portable electronic device. In one embodiment, the list of neighboring devices corresponding to the recently identified portable electronic devices are searched to identify whether the disconnected portable electronic device is neighboring to any of the connected portable electronic device and based on the search the connected portable electronic device adjacent to the disconnected portable electronic device is identified. The disconnected portable device receives the metadata transfer acknowledgment via the identified connected portable electronic device.

Figure 3:
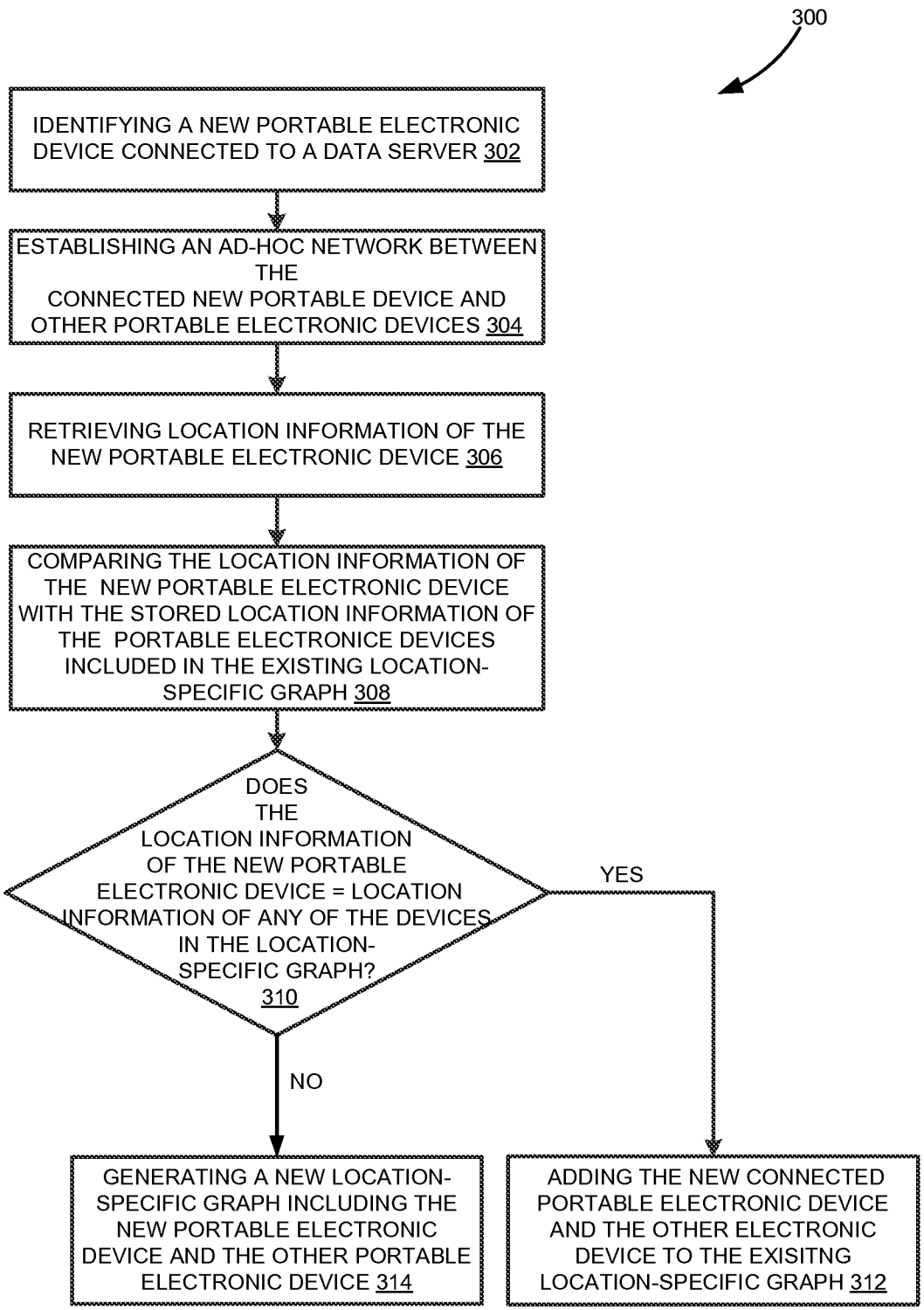
FIG. 3 is a flow diagram illustrating a process for including a new portable electronic device in a location-specific graph, according to an embodiment.

FIG. 3 is a flow diagram illustrating a process 300 for including a new portable electronic device in a location-specific graph, according to an embodiment. In one embodiment, initially a new portable electronic device connected to the data server is identified (302). The new portable electronic device may be a device that is connected to the data server after the generation of a location-specific graph for a particular location. An ad-hoc network is established between the new portable electronic device and other neighboring portable electronic devices (304). The other portable electronic devices include devices included in the same location as the new portable electronic device. In one embodiment, some of the other portable electronic devices may include portable electronic devices included in the existing location-specific graph. For example, consider an existing location-specific graph that includes devices A, B, C, and D. A new device F is identified and an ad-hoc network is established between the new device F and the other devices in the same location. The created ad-hoc network may include devices G, H, and devices C, D that are included in the existing location-specific device graph.

Next location information of the new portable electronic device is retrieved (306). The retrieved location information of the new portable electronic device is compared with the stored location information of the portable electronic devices included in the existing location-specific graphs (308). In one embodiment, when the device does not provide a location information then the location is identified from the location information of the other devices neighboring the device. To identify the location a search, for example a breadth first search, is performed to identify a neighboring device that is at a pre-defined location from the new device. In case the location information of the new portable electronic device matches with location information of any of the portable electronic devices in the existing location-specific graph (the answer of the condition 310 is yes) then the new portable electronic device is added to the existing location-specific graph (312). The other portable electronic devices with which the new portable electronic device establishes an ad-hoc network are also included in the existing location-specific graph. For example, assume that an existing location-specific graph include five vertices, representing five portable electronic devices. The location of the vertices are 22°11', 25°42', 34°16', 31°14' and 39°12'. A new device that connects to the data sever is identified. The new device establishes an ad-hoc network with two other devices. The location of the new device is retrieved as 25° 42' which matches with the location information of one of the devices in the location-specific graph. In this case the new device and the two other devices, with which the new device establishes an ad-hoc network, are included in the location-specific graph. The data server receives device metadata information, for example, information about the data residing in the device, after the device is included in the location-specific graph.

In case the location of the new portable electronic device does not match with the location of any of the portable electronic devices in the existing location-specific graph (the answer to condition 310 is no) then a new location-specific graph is generated (314). The new location-specific graph includes the new portable electronic device and the other devices with which the new portable electronic device established an ad-hoc network. In one embodiment, the new graph may be disconnected with the existing graph.

Figure 4:
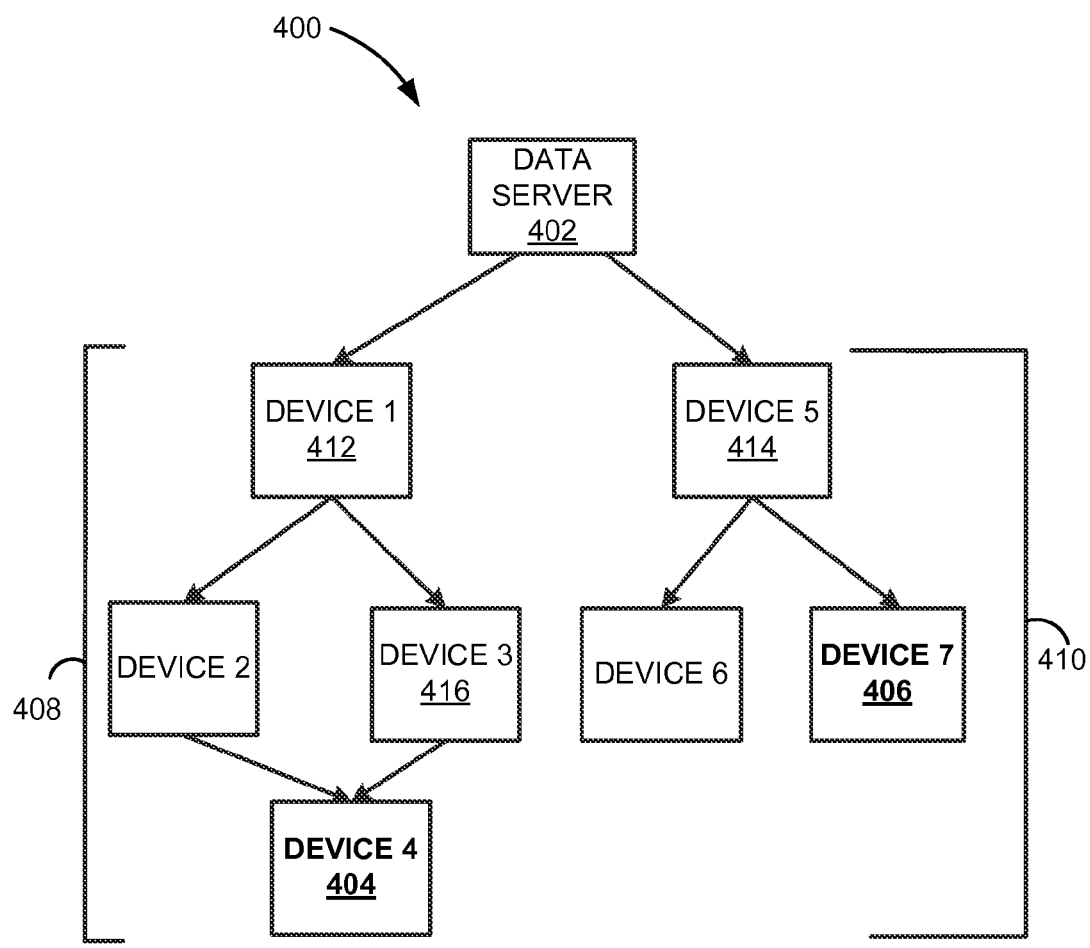
FIG. 4 is an exemplary block diagram illustrating a system to push data to several portable electronic devices, according to an embodiment.

FIG. 4 is an exemplary block diagram illustrating a system 400 to push data to several portable electronic devices, according to an embodiment. The data server 402 may select portable electronic devices 4 (404) and 7 (406) for pushing the data. To transfer data, initially the location-specific graphs 408 and 410 that include the portable electronic devices 4 (404) and 7 (406), respectively, are identified. The location-specific graphs 408 and 410 may represent devices included in different locations.

Figure 5:
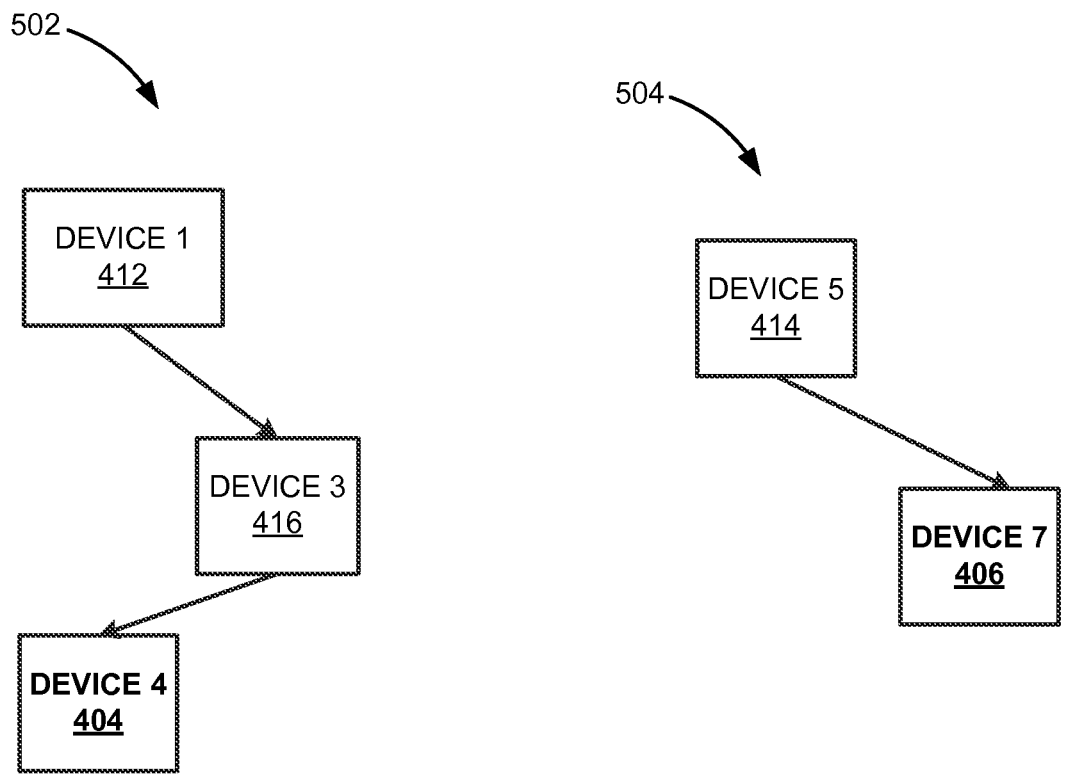
FIG. 5 is an exemplary block diagram illustrating data-distribution graphs generated based on location-specific graphs, according to an embodiment.

FIG. 5 is an exemplary block diagram illustrating data-distribution graphs 502 and 504 generated based on the location-specific graphs 408 and 410 of FIG. 4, respectively, according to an embodiment. The data-distribution graphs 502 and 504 are generated for distributing the data to device 4 (404) and device 7 (406). The data-distribution graphs 502 and 504 are generated by selecting the portable electronic devices that connects the device 4 (404) and device 7 (406) to the portable electronic device 1 (412) and device 5 (414), respectively, which are connected to the data server 402. The data-distribution graphs 502 and 504 also include the intermediate portable electronic devices that connects the portable electronic device 1 (412) and device 5 (414), connected to the data server 402, with the portable electronic devices 4 (404) and 7 (406), respectively, of FIG. 4.

In one embodiment, some of the portable electronic devices may store a portion of the data that is to be delivered. E.g., assume that a 100 MB movie clip is to be delivered to a portable electronic device. The data server may be storing 60 MB of data and one of the devices may be storing 40 MB of the movie clip. To transfer the 100 MB data the 60 MB data is transferred by the data server and the 40 MB data is transferred by the portable electronic device storing the 40 MB data. In another embodiment, the data server pushes the entire 100 MB data to each of the portable electronic devices requesting data.

In one embodiment, the data-distribution graphs 502 and 504 are generated by determining a dispersion ratio configured at the data server 402. Dispersion ratio is defined as the ratio of number of devices to which data is to be transmitted directly from the data server with respect to the total number of portable electronic devices to which the data is to be transmitted. For e.g. if there are 10 portable electronic devices to which data has to be sent and the data server is sending the data directly to 3 out of the 10 portable electronic devices, then dispersion ratio is 3:10. In one embodiment, the devices that are receiving the data directly from the data server may be the devices to which the data is to be transmitted. Based on the determined dispersion ratio, portable electronic device 1 (412) and device 5 (414) connected to the data server 404 are randomly selected. A shortest path is then identified between the selected portable electronic device 1 (412) and portable electronic device 5 (414) and the portable electronic devices 4 (404) and 7 (406), respectively, to which the data is to be delivered. In one embodiment a shortest path algorithm, for example the Dijkstra's algorithm is used to identify the shortest path between the selected portable electronic devices 1 and 4 (412 and 404) and the portable electronic devices 5 and 7 (414 and 406). In one embodiment, the shortest path is identified based on determination of a cost function. Cost function '$f_c$' is an integer function that is provided input parameters like battery-level-of-the-device, transfers-per-min etc. as input. Based on the input parameters, the cost function returns an integer value which when higher represents higher cost. The shortest path from source to destination is determined using the cost function as weight along edges In one embodiment, the shortest path is a path that has the minimum number of intermediate portable electronic devices between the connected portable electronic device 1 and 4 (412 and 404) and between the portable electronic devices 4 and 7 (414 and 406). The shortest path may also be determined based on the integer value determined by the cost function. The shortest path is then stored as a data-transfer route at the data server 402. The data transfer route provides a data route for transferring data from the selected device 1 and 5 (412 and 414), connected to the data server 402, to the portable electronic devices 4 and 7 (404 and 406), respectively to which the data is to be sent. The data transfer route may include a list of intermediate devices between the portable electronic devices receiving the data and the data server or connected portable electronic device. For example, the data transfer route for device 4 (404) is device 1→device 3→device 4 and for device 7 (406) is device 5. The data-distribution graphs 502 and 504 is then generated based on the selected portable electronic devices 1 and 5 (412 and 414) connected to the data server 402, the portable electronic devices 4 and 7 (404 and 406) to which the data is to be transferred, and the intermediate device 3 (416) connecting the device 1 (412) with device 4 (404), respectively.

In one embodiment, the data server 402 divides the data, to be delivered to device 4 and device 7 (404 and 406), into several data portions. Dividing the data into several data portions reduces the network load during the data transfer and the re-transmission load. A hash value is assigned to the different data portions that identify the data portions. A sequence number may also be provided that identifies the order of the data portions. For example a movie clip may be divided into three portions, movie 1.mov, movie 2.mov, and movie 3.mov that indicates the order of the portions of the movie. The data server then forwards the data portions to the connected portable electronic devices, device 1 (412) and device 5 (414).

The data server 402 then sends a stored data transfer route to the portable electronic devices 4 and 7 (404 and 406). In one embodiment, the data server 402 also sends data or data portions to the portable electronic devices 4 (404) and 7 (406). The data server send the stored data transfer route after receiving data delivery acknowledgement, about the delivery of data portions, from the portable electronic devices connected to the data server. In case, some of the data portions are to be sent by a portable electronic device, which stores the data portions, then the data server 402 may send a data portion metadata to the device 4 and device 7

(404 and 406). The data portion metadata identifies data portions that are to be received from the portable electronic device storing the data portion. For example, when the portable electronic device 4 (404) receives one of the three portions from the data server 402 and the remaining two data portions from the portable electronic device 1 (412) then the data server 402 sends the data portion 1 and a data portion metadata, representing the data portions that are to be received from the portable electronic device 1 (412), to the portable electronic device 4 (404). The portable electronic device 4 (404) and device 7 (406) then receives the data based on the data transfer route received from the data server 402. In one embodiment an acknowledgment is received by the data server, which informs the server about the successful transfer of data.

Figure 6A:
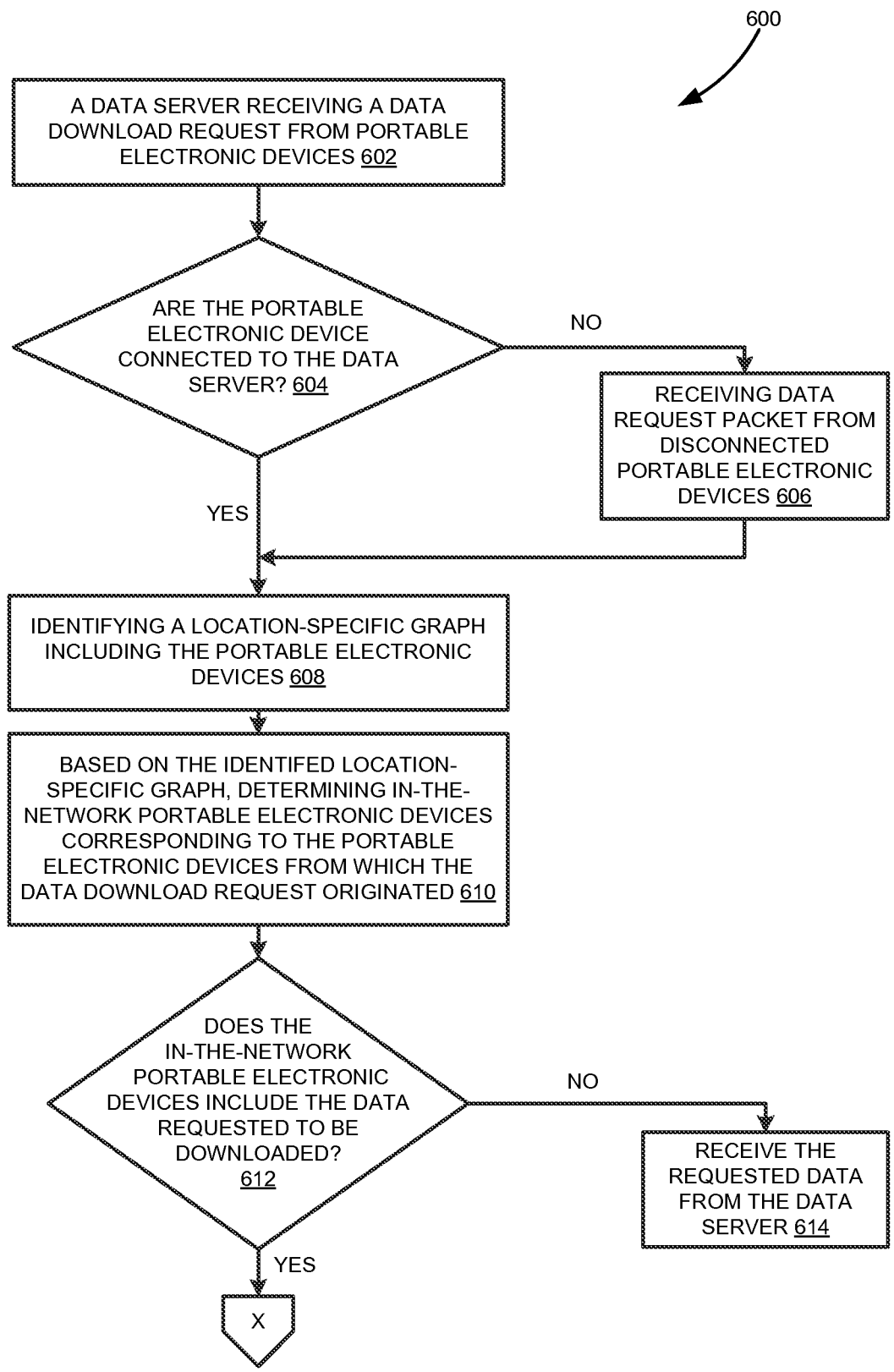
FIG. 6A-B is a flow diagram illustrating a process for distributing data to portable electronic devices, according to an embodiment.
Figure 6B:
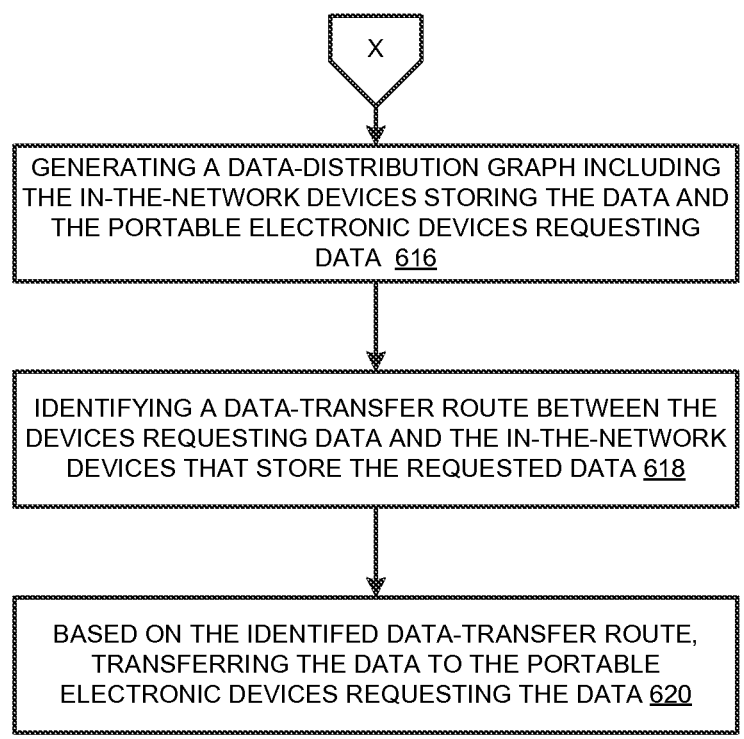

FIG. 6A-B is a flow diagram illustrating a process 600 for distributing data to portable electronic devices, according to an embodiment. Initially a data server receives a data download request from one or more portable electronic devices (602). A determination is made, at 604, whether the data request originates from a portable electronic device connected to the data server or from a portable electronic device disconnected from the data server. When the data request is made from a disconnected portable electronic device then the data server receives a data request packet from the disconnected portable electronic device (606). A data request packet includes a data-transfer route for transferring data request from the disconnected portable electronic device to the portable electronic device connected to the data server. The data request packet also includes a unique identifier for identifying the content requested by the device. The data server identifies the disconnected portable electronic device based on the received data request packet.

Next a location-specific graph that includes the portable electronic devices, connected or not connected to the data server, that are requesting the data are identified (608). Based on the identified location-specific graph the in-the-network portable electronic devices corresponding to the portable electronic device from which the data download request originated are determined (610). In case of a requesting portable electronic device that is disconnected from the server, the in-the-network portable electronic devices correspond to a connected portable electronic device having a data transfer route to the disconnected portable device, are identified.

Next a determination is made whether the in-the-network portable electronic devices corresponding to the portable electronic devices requesting the data download store the requested data (612). In case none of the in-the-network portable electronic devices do not store the data, then the data is received from the data-server as explained in FIG. 4 and FIG. 5 (614). In case one or more of the in-the-network portable electronic devices include the requested data then a data-distribution graph is generated that includes the portable electronic devices requesting data and the in-the-network portable electronic devices that store the requested data (616). The data-distribution graph may be generated based on the location-specific graph. In this case, the data-routes, included in the location-specific graph, and the intermediate devices are included in the data-distribution graph. In one embodiment, a data portion download ratio is determined that is defined as the number of data portions to be downloaded from the server to the total number of data portions that are requested. For e.g. when the requested content is comprised of 10 data portions and configured data portion download ratio is 2:5, then 4 data portions are downloaded from the server and remaining 6 portions are downloaded from the devices that store these data portions. Based on data portion download ratio, server allocates appropriate number of data portions to server and devices storing the data portions.

Next a data-transfer route is identified between the portable electronic device and the in-the-network devices that store the requested data (618). In one embodiment, a shortest path algorithm, for example Dijkstra's algorithm, is applied to identify the data-transfer route between the devices. The data-transfer route includes a sequence of portable electronic devices that provides a data-transfer from the in-the-network portable electronic devices storing the data and the devices requesting the data. Finally the data is transferred to the portable electronic devices based on the determined data-transfer route (620). The data server forwards the identified data-transfer route to the portable electronic devices requesting the data. In one embodiment, when the data is to be downloaded directly from the data server then the server details would be sent to the device or else the metadata representing the data portions and route details of the portable electronic device storing the data portions is sent to the portable electronic device requesting the data.

Figure 7:
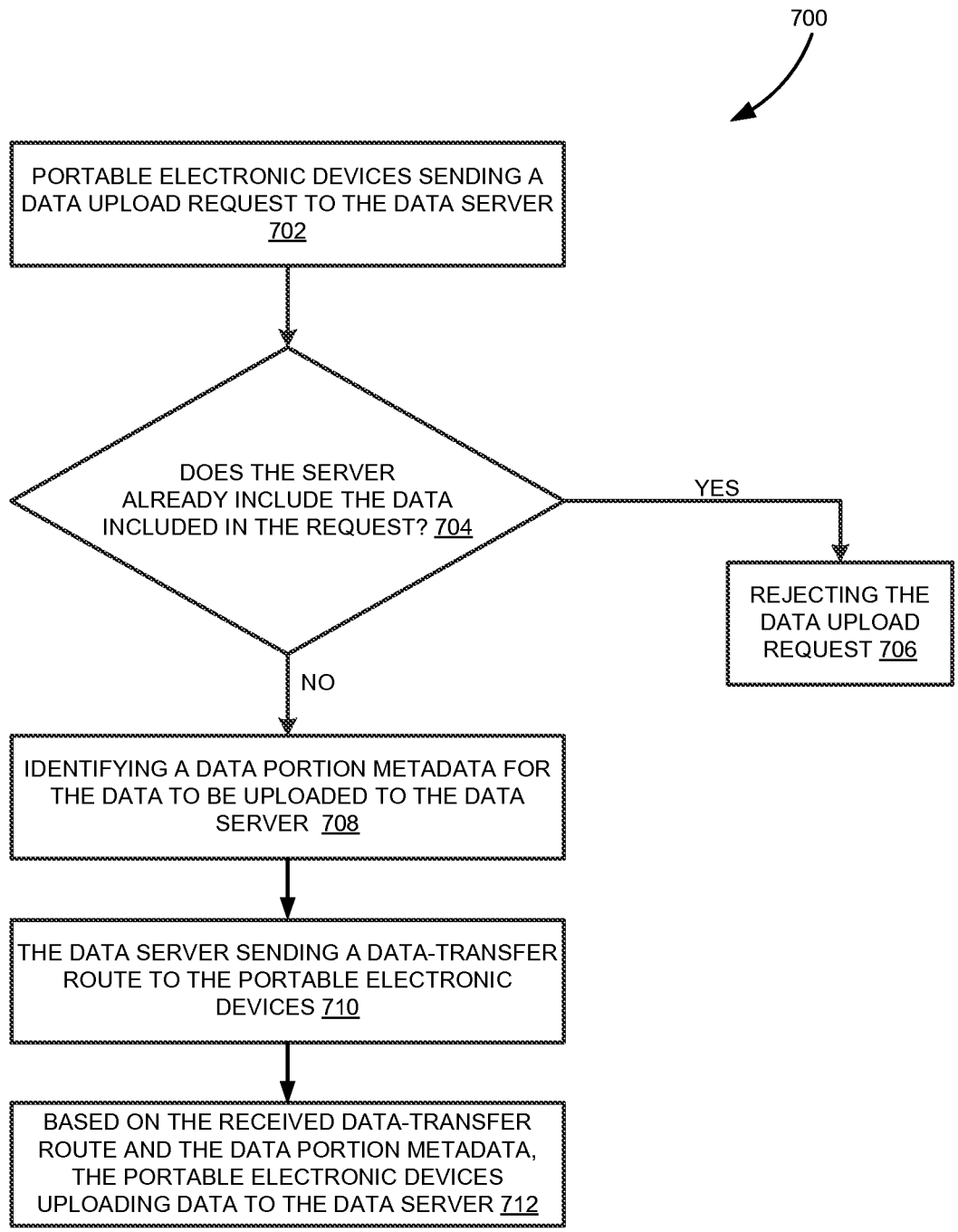
FIG. 7 is a flow diagram illustrating a process to upload data to a data server from portable electronic devices connected to the data server, according to an embodiment.

FIG. 7 is a flow diagram illustrating process 700 to upload data to a data server from portable electronic devices connected to the data server, according to an embodiment. A portable electronic device sends a data upload request for uploading data to the data server (702). The data upload request may include data or metadata, for example file parameters (name, size, format, etc.), related to the data. Based on the received data upload request, identification is made whether the data server already includes the data to be uploaded (704). In case the data server already includes the data (condition in 704 is true) then the data upload request is rejected (706).

Next when the data server does not contain the data included in the data upload request (condition in 704 is negative), then the data-server identifies a data portion metadata for the data to be uploaded to the data server (708). The data portion metadata identifies the data portions that are to be uploaded at the data server from each of the portable electronic devices. As the data portions include sequence numbers the data server arranges the received data portions in the correct order.

The data server then sends a data-transfer route to the portable electronic devices that send the data upload request (710). As the portable electronic devices are connected to the data-server, the data-transfer route includes the name of the data server. The data server also sends the data portion metadata to the devices. Finally the portable electronic devices upload the data to the data server based on the received data-transfer route and the data portion metadata (712).

Figure 8:
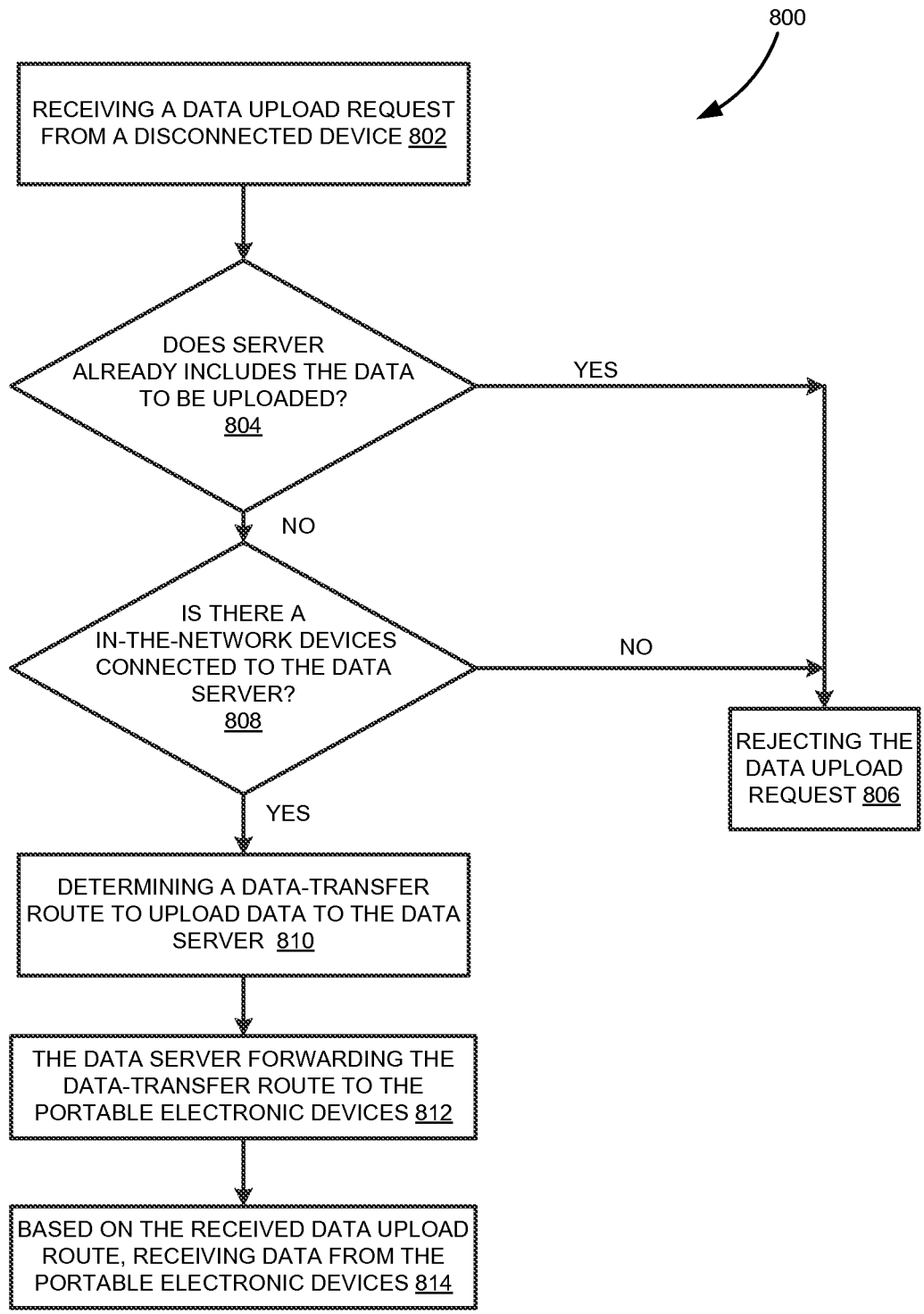
FIG. 8 is a flow diagram illustrating a process for uploading data to a data server from a portable electronic device not connected to the data server, according to an embodiment.

FIG. 8 is a flow diagram illustrating a process 800 for uploading data to a data server from a portable electronic device not connected to the data server, according to an embodiment. Initially a data upload request is received from a portable electronic device (802). Based on the received data upload request the data server determines whether the data requested to be uploaded at the data server is already stored at the data server (804). In case, the data server stores the data then the data upload request is discarded (806). However in case the data is not included in the data server then a check is performed to determine whether any of the in-the-network portable electronic devices, corresponding to the portable electronic device requesting uploading of data, is connected to the data server (808). In case there is no in-the-network portable electronic device connected to the data server then the data upload request is rejected (806).

In case an in-the-network portable electronic device is connected to the data server then a data-transfer route is determined for uploading data to the data server (810). In one embodiment, the data server determines a data transfer route for transferring data from the disconnected portable electronic device to the in-the-network device, connected to the data server, which upload the data to the data server.

To determine the data-transfer route, initially a location-specific graph including the portable electronic device, which send the data upload request, is identified. A determination is then made whether any of the in-the-network portable electronic devices in the location-specific graph includes portions of the data that is to be uploaded. Based on the determination, a data-distribution graph is generated that includes the portable electronic device that send the data upload request, the in-the-network portable electronic device connected to the data server, and the in-the-network portable electronic devices containing portions of the data to be uploaded. The data server then determines a data-transfer route between the in-the-network portable electronic device connected to the data server and the portable electronic device that send the data transfer request. In one embodiment, the data server applies a shortest path algorithm to determine the data-transfer route between the in-the-network device, connected to the data server and the device that send the data request. In one embodiment, a portion of the data to be uploaded may be stored in a connected device. The data server may determine a connected device upload ratio which is a ratio of number of data portions to be transmitted from the connected portable electronic device to the total number of data portions that are to be uploaded. For example, a data upload ration of 7:10 means that 7 data portions are to be transmitted from the connected portable electronic device and three data portions are to be transmitted from the in-the-network devices. The data server also identifies the data portions to be uploaded from the connected portable electronic devices.

The data server then sends the identified data-transfer route to the portable electronic device that send the data upload request and the connected portable electronic devices storing portion of the to be uploaded data (812). In case of a connected portable electronic device the data transfer route includes a server identification that indicates that the device is directly connected to the data server. Based on the received data-transfer route, the portable electronic device uploads the data to the data server (814).

Some embodiments may include the above-described methods being written as one or more software components. These components, and the functionality associated may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 9:
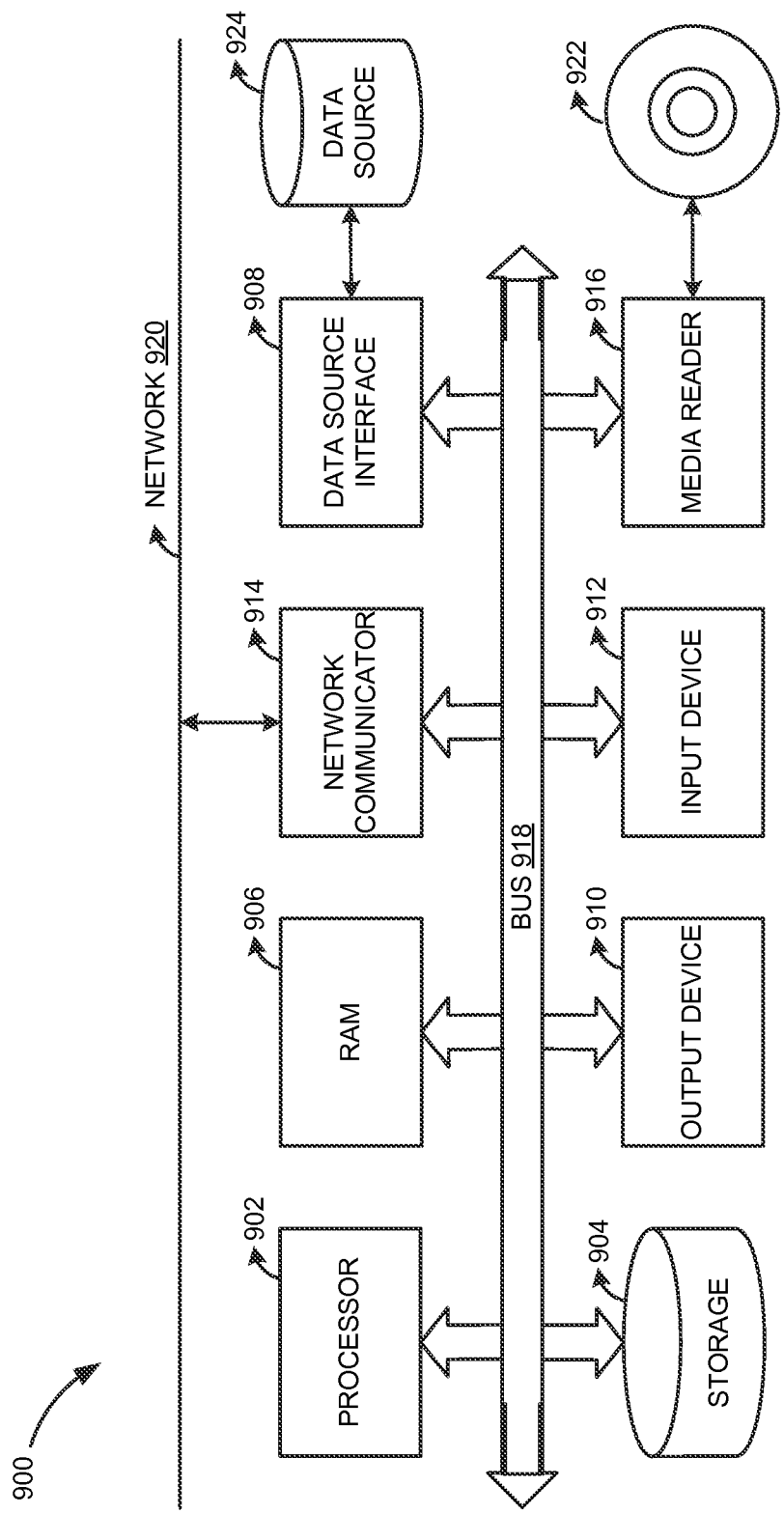
FIG. 9 is a block diagram illustrating a computing environment of data distribution, according to an embodiment.

FIG. 9 is a block diagram of an exemplary computer system 900. The computer system 900 includes a processor 902 that executes software instructions or code stored on a computer readable storage medium 922 to perform the above-illustrated methods of the invention. The computer system 900 includes a media reader 916 to read the instructions from the computer readable storage medium 922 and store the instructions in storage 904 or in random access memory (RAM) 906. The storage 904 provides a large space for keeping static data where at least some instructions could be stored for later execution. The stored instructions may be further compiled to generate other representations of the instructions and dynamically stored in the RAM 906. The processor 902 reads instructions from the RAM 906 and performs actions as instructed. According to one embodiment of the invention, the computer system 900 further includes an output device 910 (e.g., a display) to provide at least some of the results of the execution as output including, but not limited to, visual information to users and an input device 912 to provide a user or another device with means for entering data and/or otherwise interact with the computer system 900. Output devices 910 and input devices 912 could be joined by one or more additional peripherals to further expand the capabilities of the computer system 900. A network communicator 914 may be provided to connect the computer system 900 to a network 920 and in turn to other devices connected to the network 920 including other clients, servers, data stores, and interfaces, for instance. The modules of the computer system 900 are interconnected via a bus 918. Computer system 900 includes a data source interface 908 to access data source 924. The data source 924 can be accessed via one or more abstraction layers implemented in hardware or software. For example, the data source 924 may be accessed by network 920. In some embodiments the data source 924 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the invention are described herein for illustrative purposes, various equivalent modifications are possible within the scope of the invention, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method for distributing data, the method comprising:
   at a data server, receiving a path identification request from a portable electronic device disconnected from the data server;
   the data server receiving a data download request from the portable electronic device disconnected from the data server;
   dividing, by the data server, the requested data into a plurality of data portions;
   based on the path identification request in an ad-hoc network, identifying a data-transfer route between a plurality of portable electronic devices connected to the data server and the portable electronic device disconnected from the data server;
   the data server forwarding the plurality of data portions to the plurality of portable electronic devices connected to the data server; and
   based on the identified data-transfer route, transferring the requested data from the plurality of portable electronic devices connected to the data server to the portable electronic device disconnected from the data server.

2. The computer implemented method according to claim 1, further comprising:
   identifying the plurality of portable electronic devices connected to the data server;
   establishing an ad-hoc network between the plurality of portable electronic devices connected to the data server and the portable electronic device disconnected from the data server;
   based on the established ad-hoc network, generating a location-specific graph including the plurality of portable electronic devices connected to the data server and the portable electronic device disconnected from the data server; and
   storing location information of the plurality of portable electronic devices connected to the data server and the portable electronic device disconnected from the data server included in the location-specific graph at the data server.

3. The computer implemented method according to claim 2, further comprising:
   identifying a new portable electronic device connected to the data server;
   establishing an ad-hoc network between the identified new portable electronic device and another portable electronic device;
   comparing a location information of the identified new portable electronic device with the stored location information of the plurality of portable electronic devices connected to the data server and the portable electronic device disconnected from the data server included in the location-specific graph; and
   based on the comparison, adding the new connected portable electronic device and the another portable electronic device to the location-specific graph.

4. The computer implemented method according to claim 2, further comprising:
   executing, by the data server, a shortest path algorithm on the location-specific graph to identify the data-transfer route between the plurality of portable electronic devices connected to the data server and the portable electronic device disconnected from the data server.

5. The computer implemented method according to claim 2, further comprising:
   in the ad-hoc network, determining whether a portable electronic device from the plurality of portable electronic devices connected to the data server, store a portion of the requested data; and
   based on the determination, transferring the portion of the requested data from the portable electronic device to the portable electronic device disconnected from the data server and transferring remaining portion of the data from the data server to the portable electronic device disconnected from the data server.

6. The computer implemented method according to claim 1, further comprising:
   the data server receiving a data upload request from a portable electronic device;

determining whether the data to be uploaded is stored at the data server;

based on the determination, sending a data-transfer route to the portable electronic device; and uploading the data to the data server based on the sent data transfer route.

7. The computer implemented method according to claim 1, wherein receiving the path identification request from the portable electronic devices disconnected from the data server is at pre-determined time interval.

8. A computer system for distributing data, the computer system comprising:

a processor to execute a program code; and a memory coupled to the processor, the memory storing the program code comprising:

at a data server, receive a path identification request from a portable electronic device disconnected from the data server;

receive at the data server a data download request from the portable electronic device disconnected from the data server;

divide, the data server, the requested data into a plurality of data portions;

based on the path identification request in an ad-hoc network, identify a data-transfer route between a plurality of portable electronic devices connected to the data server and the portable electronic device disconnected from the data server;

the data server forward the plurality of data portions to the plurality of portable electronic devices connected to the data server; and based on the identified data-transfer route, transfer the requested data from the plurality of portable electronic devices connected to the data server to the portable electronic device disconnected from the data server.

9. The computer system according to claim 8, further comprising:

identify the plurality of portable electronic devices connected to the data server;

establish an ad-hoc network between the plurality of portable electronic devices connected to the data server and the portable electronic device disconnected from the data server;

based on the established ad-hoc network, generate a location-specific graph including the plurality of portable electronic devices connected to the data server and the portable electronic device disconnected from the data server; and store location information of the plurality of portable electronic devices connected to the data server and the portable electronic device disconnected from the data server included in the location-specific graph at the data server.

10. The computer system according to claim 9, further comprising:

identify a new portable electronic device connected to the data server;

establish an ad-hoc network between the identified new portable electronic device and another portable electronic device;

compare a location information of the identified new portable electronic device with the stored location information of the plurality of portable electronic devices connected to the data server and the portable electronic device disconnected from the data server included in the location-specific graph; and based on the comparison, add the new portable electronic device and the another portable electronic device to the location-specific graph.

11. The computer system according to claim 9, further comprising:

execute a shortest path algorithm on the location-specific graph to identify the data-transfer route between the plurality of portable electronic devices connected to the data server and the portable electronic device disconnected from the data server.

12. The computer system according to claim 9, further comprising:

in the ad-hoc network, determine whether a portable electronic device from the plurality of portable electronic devices connected to the data server store a portion of the requested data; and based on the determination, transfer the portion of the requested data from the portable electronic device to the portable electronic device disconnected from the data server and transferring remaining portion of the data from the data server to the portable electronic device disconnected from the data server.

13. The computer system according to claim 8, further comprising:

receive a data upload request from a portable electronic device;

determine whether the data to be uploaded is stored at the data server;

based on the determination, send a data-transfer route to the portable electronic device; and upload the data to the data server based on the sent data transfer route.

14. A non-transitory computer readable storage medium to tangibly store instructions, which when executed by a computer, cause the computer to:

at a data server, receive a path identification request from a portable electronic device disconnected from the data server;

receive at the data server a data download request from the portable electronic device disconnected from the data server;

divide by the data server, the requested data into a plurality of data portions;

based on the path identification request in an ad-hoc network, identify a data-transfer route between the one or more portable electronic devices and a plurality of portable electronic devices connected to the data server, wherein the one or more portable electronic devices includes the plurality of portable electronic device connected to the data server and the portable electronic device disconnected from the data server;

the data server forward the plurality of data portions to the plurality of portable electronic devices connected to the data server; and based on the identified data-transfer route, transfer the requested data from the plurality of portable electronic devices connected to the data server to the portable electronic device disconnected from the data server.

15. The non-transitory computer readable medium according to claim 14, further comprising instructions which when executed by the computer further causes the computer to:

identify the plurality of portable electronic devices connected to the data server;

establish an ad-hoc network between the plurality of portable electronic devices connected to the data server and the portable electronic device disconnected from the data server;

based on the established ad-hoc network, generate a location-specific graph including the plurality of portable electronic devices connected to the data server and the portable electronic device disconnected from the data server; and store location information of the plurality of portable electronic devices connected to the data server and the portable electronic device disconnected from the data server included in the location-specific graph at the data server.

16. The non-transitory computer readable medium according to claim 15, further comprising instructions which when executed by the computer further causes the computer to:

identify a new portable electronic device connected to the data server;

establish an ad-hoc network between the identified new portable electronic device and another portable electronic device;

compare a location information of the identified new portable electronic device with the stored location information of the plurality of portable electronic devices connected to the data server and the portable electronic device disconnected from the data server included in the location-specific graph; and based on the comparison, add the new portable electronic device and the another portable electronic device to the location-specific graph.

17. The non-transitory computer readable medium according to claim 16, further comprising instructions which when executed by the computer further causes the computer to:

in the ad-hoc network, determine whether a portable electronic device from the plurality of portable electronic devices connected to the data server store a portion of the requested data; and based on the determination, transfer the portion of the requested data from the portable electronic device to the portable electronic device disconnected from the data server and transferring remaining portion of the data from the data server to the portable electronic device disconnected from the data server.

18. The non-transitory computer readable medium according to claim 15, further comprising instructions which when executed by the computer further causes the computer to:

execute a shortest path algorithm on the location-specific graph to identify the data-transfer route between the plurality of portable electronic devices connected to the data server and the portable electronic device disconnected from the data server.

19. The non-transitory computer readable medium according to claim 16, further comprising instructions which when executed by the computer further causes the computer to:

receive a data upload request from a portable electronic device;

determine whether the data to be uploaded is stored at the data server;

based on the determination, send a data-transfer route to the portable electronic device; and upload the data to the data server based on the sent data transfer route.

* * * * *